(12) United States Patent
Guo et al.

(10) Patent No.: US 11,217,188 B2
(45) Date of Patent: Jan. 4, 2022

(54) METHOD FOR DISPLAYING IMAGE ON DUAL-SCREEN DISPLAY PANEL AND RELATED APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Jun Guo, Beijing (CN); Cuilan Huang, Beijing (CN); Luqiang Guo, Beijing (CN); Jieqiong Wang, Beijing (CN); Hongming Zhan, Beijing (CN); Ruichen Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/757,907

(22) PCT Filed: Nov. 16, 2018

(86) PCT No.: PCT/CN2018/115994
§ 371 (c)(1),
(2) Date: Apr. 21, 2020

(87) PCT Pub. No.: WO2020/097930
PCT Pub. Date: May 22, 2020

(65) Prior Publication Data
US 2021/0217371 A1 Jul. 15, 2021

(51) Int. Cl.
*G09G 3/36* (2006.01)

(52) U.S. Cl.
CPC ......... *G09G 3/3607* (2013.01); *G09G 3/3696* (2013.01); *G09G 2300/023* (2013.01); *G09G 2320/0276* (2013.01); *G09G 2360/04* (2013.01)

(58) Field of Classification Search
CPC ............... G09G 3/3607; G09G 3/3696; G09G 2300/023; G09G 2320/0276; G09G 2360/04
See application file for complete search history.

(56) References Cited

U.S. PATENT DOCUMENTS 10,670,915 B2 * 6/2020 Suzuki ............. G02F 1/133602
2007/0279433 A1 12/2007 Huang
(Continued)

FOREIGN PATENT DOCUMENTS

CN 101894532 A 11/2010
CN 102097068 A 6/2011
(Continued)

OTHER PUBLICATIONS

International Search Report issued in International Application No. PCT/CN2018/115994, dated Jul. 26, 2019, 6 pages.
(Continued)

*Primary Examiner* — Gene W Lee
(74) *Attorney, Agent, or Firm* — Dave Law Group LLC; Raj S. Dave

(57) ABSTRACT

The embodiments of the present disclosure provide a method for displaying an image on a dual-screen display panel. According to an embodiment, the dual-screen display panel comprises a dimming screen and a display screen. The method comprises: generating first image data for the dimming screen according to image data; determining dimming driving voltages for a plurality of dimming areas based on the first image data according to a grayscale-dimming driv-
(Continued)

ing voltage relationship; determining display driving voltages for a plurality of display areas based on the image data according to a grayscale-display driving voltage relationship; and driving the dimming screen and the display screen with the determined dimming driving voltages and display driving voltages, respectively, to display the image.

19 Claims, 6 Drawing Sheets

(56) References Cited

U.S. PATENT DOCUMENTS

| | | | |
|---|---|---|---|
| 2008/0252666 A1 | 10/2008 | Tanaka et al. | |
| 2009/0284181 A1 | 11/2009 | Kim et al. | |
| 2010/0295879 A1 | 11/2010 | Chen | |
| 2011/0141166 A1 | 6/2011 | Ahn et al. | |
| 2012/0194493 A1 | 8/2012 | Chen et al. | |
| 2012/0281028 A1 | 11/2012 | Soto | |
| 2016/0093252 A1* | 3/2016 | Harada | G09G 3/3426 345/694 |
| 2018/0374435 A1 | 12/2018 | Orlick et al. | |
| 2019/0064559 A1* | 2/2019 | Harada | G09G 3/3677 |
| 2020/0243025 A1 | 7/2020 | Xi et al. | |

FOREIGN PATENT DOCUMENTS

| | | |
|---|---|---|
| CN | 102243855 A | 11/2011 |
| CN | 104299579 A | 1/2015 |
| CN | 106842724 A | 6/2017 |
| CN | 108510947 A | 9/2018 |
| CN | 108564924 A | 9/2018 |
| JP | 2008-020574 A | 1/2008 |
| JP | 2013-513835 A | 4/2013 |
| JP | 2013-238656 A | 11/2013 |
| KR | 1020080092581 A | 10/2008 |
| KR | 20110066510 A | 6/2011 |
| KR | 1020120087858 A | 8/2012 |
| KR | 1020150013768 A | 2/2015 |

OTHER PUBLICATIONS

Written Opinion of International Search Authority n International Application No. PCT/CN2018/115994, dated Jul. 22, 2019, 5 pages.
Notification of Reason for Refusal dated Jan. 13, 2021 for Korean Application No. 1020197035073, 10 pages.
Office Action dated Jun. 10, 2021 for Chinese patent application No. 201880002073, 20 pages.
Written Decision on Registration of the counterpart KR application dated Jul. 27, 2021 for Korean patent application No. 1020197035073, 4 pages.

* cited by examiner

METHOD FOR DISPLAYING IMAGE ON DUAL-SCREEN DISPLAY PANEL AND RELATED APPARATUS

CROSS-REFERENCE TO RELATED APPLICATIONS

This patent application is a National Stage Entry of PCT/CN2018/115994 filed on Nov. 16, 2018, the disclosure of which incorporated by reference herein in its entirety as part of the present application.

TECHNICAL FIELD

The present disclosure relates to the field of display technology, and particularly to a method and an apparatus for displaying an image on a dual-screen display panel as well as the related dual-screen display panel.

BACKGROUND

In a conventional display device, a global dimming technology is generally used for backlight. However, for the display device with the global dimming, after a user sets a luminance for the display device, the backlight luminance remains unchanged during the display, and thus there are problems such as low contrast, high energy consumption, and obvious heating effects, etc. Currently, a local dimming technology is provided, which can adjust the backlight locally in real time according to image data, thereby improving the image contrast, reducing power consumption, and reducing heat generation.

SUMMARY

Embodiments of the present disclosure provide a method and an apparatus for displaying an image on a dual-screen display panel and the related dual-screen display panel.

A first aspect of the present disclosure provides a method for displaying an image on a dual-screen display panel. The dual-screen display panel comprises a dimming screen and a display screen. The display screen comprises a plurality of display areas, and the dimming screen comprises a plurality of dimming areas. The method comprises: generating first image data for the dimming screen based on image data of the image; determining dimming driving voltages for the plurality of dimming areas corresponding to the first image data according to a grayscale-dimming driving voltage relationship for the dimming screen; determining display driving voltages for the plurality of display areas corresponding to the image data according to a grayscale-display driving voltage relationship for the display screen; and driving the dimming screen and the display screen with the dimming driving voltages and the display driving voltages, respectively, to display the image.

In an embodiment of the present disclosure, the method may further comprise: adjusting the image data to generate second image data for the display screen according to a grayscale adjustment relationship for the display screen. In the embodiment, the second image data may be used to determine the display driving voltages.

In an embodiment of the present disclosure, generating the first image data for the dimming screen may comprise: determining a characterizing grayscale of each of the plurality of display areas based on the image data; and determining grayscale data of each of the plurality of dimming areas based on the characterizing grayscale of each display area to form the first image data.

In an embodiment of the present disclosure, determining the characterizing grayscale of each of the plurality of display areas may comprise: determining grayscale data of each primary color for each display area based on the image data; and determining, for each display area, a maximum grayscale of the grayscales of primary colors as the characterizing grayscale of the display area.

In an embodiment of the present disclosure, one dimming area may correspond to one display area, and the grayscale data of each of the plurality of dimming areas may be determined as the characterizing grayscale of the corresponding display area.

In an embodiment of the present disclosure, one dimming area may correspond to multiple display areas, and determining the grayscale of each of the plurality of dimming areas based on the characterizing grayscale of each display area may comprise: determining, for each dimming area, the maximum characterizing grayscale of the characterizing grayscales of the corresponding multiple display areas as the grayscale data of the dimming area.

In an embodiment of the present disclosure, the grayscale adjustment relationship may comprise a respective primary color grayscale adjustment table for each primary color. In the embodiment, adjusting the image data to generate the second image data for the display screen according to the grayscale adjustment relationship for the display screen may comprise: obtaining, for grayscale data of the respective primary colors in the image data, adjusted grayscale data by means of the respective primary color grayscale adjustment table.

In an embodiment of the present disclosure, the grayscale adjustment relationship may comprise a dimming formula. In the embodiment, adjusting the image data to generate second image data for the display screen according to the grayscale adjustment relationship for the display screen may comprise: obtaining grayscales of the plurality of display areas according to the image data; calculating adjusted grayscales of the plurality of display areas by using the diming formula based on the grayscales of the plurality of display areas; and obtaining adjusted image data as the second image data according to the adjusted grayscales.

In an embodiment of the present disclosure, the grayscale-dimming driving voltage relationship may be established by: determining, for each of a plurality of grayscales, a first desired transmittance of the dimming screen corresponding to the grayscale; determining an initial dimming driving voltage corresponding to the grayscale based on a first grayscale-transmittance diagram for the display screen and a second grayscale-transmittance diagram for the dual-screen display panel; determining a first desired transmittance of the dimming screen corresponding to the grayscale; determining an initial dimming driving voltage corresponding to the grayscale based on the first desired transmittance and a transmittance-driving voltage diagram for the dimming screen; determining a display driving voltage corresponding to the grayscale based on the first grayscale-transmittance diagram and the transmittance-driving voltage diagram for the display screen; driving the dimming screen and the display screen with the initial dimming driving voltages and the display driving voltages, respectively; measuring an actual total transmittance of the dual-screen display panel; adjusting, in response to a difference between a desired total transmittance and the actual total transmittance of the dual-screen display panel being greater than a transmittance threshold, the dimming driving voltage until the difference is less than or equal to the transmittance threshold; and storing the plurality of grayscales in association with the corresponding dimming driving voltages to establish the grayscale-dimming driving voltage relationship.

In an embodiment of the present disclosure, determining the first desired transmittance of the dimming screen corresponding to the grayscale may comprise: determining a second desired transmittance of the display screen corresponding to the grayscale based on the first grayscale-transmittance diagram; determining the desired total transmittance of the dual-screen display panel corresponding to the grayscale based on the second grayscale-transmittance diagram; and calculating a ratio of the desired total transmittance to the second desired transmittance as the first desired transmittance.

In an embodiment of the present disclosure, the grayscale adjustment relationship may comprise a respective primary color grayscale adjustment table for each primary color. In the embodiment, the primary color grayscale adjustment table of a primary color may be established by: determining, for each of a plurality of grayscales, a desired total transmittance of the primary color of the dual-screen display panel based on a desired grayscale-transmittance diagram of the primary color; estimating an actual transmittance of the dimming screen corresponding to the grayscale according to the grayscale-dimming driving voltage relationship and a transmittance-driving voltage diagram for the dimming screen; calculating a ratio of the desired total transmittance of the primary color to the estimated actual transmittance of the dimming screen as a desired transmittance of the primary color of the display screen; determining an adjusted grayscale based on the desired transmittance of the primary color and a first grayscale-transmittance diagram of the display screen; and storing the plurality of grayscales in association with the corresponding adjusted grayscales to establish the primary color grayscale adjustment table for the primary color.

In an embodiment of the present disclosure, the desired grayscale-transmittance diagram of the primary color may be determined by: measuring a total luminance of backlight emitted by a backlight source and a luminance of the primary color in the backlight; calculating a ratio of the luminance of the primary color to the total luminance; and obtaining the desired grayscale-transmittance diagram of the primary color according to the calculated ratio and a second grayscale-transmittance diagram for the dual-screen display panel.

In an embodiment of the present disclosure, the grayscale adjustment relationship may be established by: determining training dimming driving voltages for each of the plurality of dimming areas according to training image data and the grayscale-dimming driving voltage relationship; determining a desired total transmittance of the dual-screen display panel according to the training image data and a second grayscale-transmittance diagram for the dual-screen display panel; adjusting grayscales of the training image data using a dimming formula; determining training display driving voltages for each of the plurality of display areas according to the adjusted grayscales and the grayscale-display driving voltage relationship; driving the dimming screen and the display screen with the training dimming driving voltages and the training display driving voltages, respectively; measuring an actual total transmittance of the dual-screen display panel; adjusting, in response to a difference between the desired total transmittance and the actual total transmittance of the dual-screen display panel being greater than a transmittance threshold, an adjustment coefficient of the dimming formula until the difference is less than or equal to the transmittance threshold; and determining, in response to the difference being less than or equal to the transmittance threshold, the current dimming formula as the grayscale adjustment relationship.

In an embodiment of the present disclosure, the dimming formula may be expressed as $Y=y+a*y*(b*y\_feature-y)/y\_feature$, wherein Y represents an adjusted grayscale, y represents an initial grayscale, y_feature represents a feature grayscale, and a and b represent adjustment coefficients.

In an embodiment of the present disclosure, determining training dimming driving voltages for each of the plurality of dimming areas according to training image data and the grayscale-dimming driving voltage relationship may comprise: determining a characterizing grayscale of each of the plurality of display areas based on the training image data; determining grayscale data of each dimming area based on the characterizing grayscale of each display area; and determining the training dimming driving voltages for each dimming area according to the grayscale-dimming driving voltage relationship and the grayscale data of each dimming area.

In an embodiment of the present disclosure, determining the characterizing grayscale of each of the plurality of display areas may comprise: determining grayscale data of each primary color for each of the plurality of display areas according to the training image data; and determining, for each display area, the maximum grayscale data of the grayscale data as the characterizing grayscale of the display area.

In an embodiment of the present disclosure, the method may further comprise: blurring the first image data.

In an embodiment of the present disclosure, the first grayscale-transmittance diagram may be a gamma curve with a gamma value of 2.2, and the second grayscale-transmittance diagram may be a gamma curve with a gamma value greater than 2.2.

The second aspect of the present disclosure provide an apparatus for displaying an image on a dual-screen display panel. The apparatus comprises: one or more processors; a memory coupled to the one or more processors and having computer program instructions stored therein, wherein the computer program instructions, when executed by the one or more processors, cause the apparatus to perform the method according to the first aspect of the present disclosure.

The third aspect of the present disclosure provides a dual-screen display panel. The dual-screen display panel comprises: a backlight source, a dimming screen, a display screen, and an apparatus according to the second aspect of the present disclosure, wherein the dimming screen is disposed between the backlight source and the display screen.

In an embodiment of the present disclosure, the dimming screen may be a black and white liquid crystal display screen, and the display screen may be a color liquid crystal display screen.

BRIEF DESCRIPTION OF THE DRAWINGS

In order to illustrate the technical solutions of the embodiments of the present disclosure more clearly, drawings of the embodiments will be briefly described below. It should be appreciated that the drawings described below only relate to some embodiments of the present disclosure, rather than limiting the present disclosure, wherein throughout each of these drawings, corresponding reference numeral indicate corresponding part or feature.

DETAILED DESCRIPTION

Figure 1:
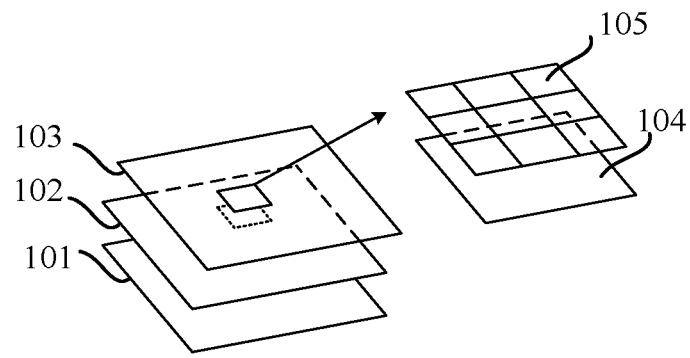
FIG. 1 shows a schematic diagram of a general structure of the dual-screen display panel.

In order to make the objective, technical solutions and advantages of the present disclosure more clear, the technical solutions in the embodiments of the present disclosure will be clearly and completely described below in conjunction with the drawings. Obviously, the embodiments described merely some but not all of embodiments of the present disclosure. Based on the described embodiments of the present disclosure, all other embodiments obtained by those skilled in the art without creative work also fall within the protecting scope of the present disclosure.

The terms "a(an)", "one", "this", and "the", etc. are intended to mean the presence of one or more elements when referring to the elements and their embodiments of the present disclosure. The terms "comprise", "comprising", "include", "including", "contain", "containing", "have", and "having", etc. are intended that an element or article ahead of this term encompasses element(s) (or equivalent(s)) or article(s) (or equivalent(s)) listed behind this term, and does not exclude the other elements or articles.

For the purpose of the following description, the terms "upper", "lower", "left", "right", "vertical", "horizontal", "top", "bottom" and derivatives thereof, shall involve the present disclosure as in the denoted direction in the drawings. The terms "on", "on top of . . . ", "located on . . . ", or "located on top of . . . " mean the presence of a first element such as a first structure on a second element such as a second structure, wherein an intermediate element such as an interface structure may be located between the first element and the second element. The term "contact" means connecting the first element such as a first structure with the second element such as a second structure, while other elements may be or may be not located at the interface between the two elements.

Unless otherwise defined, all terms (including technical and scientific terms) used herein should have the same meaning as commonly understood by those skilled in the art to which the matter of the present disclosure belongs. It will be further understood that each of terms, such as those defined in general dictionaries, should be interpreted as having a meaning that is consistent with the meaning in the context of the specification and the relevant art and will not be interpreted in an idealized or overly formal sense unless otherwise defined. As employed herein, the statement that two or more parts are "connected" or "coupled" together may mean that these parts are joined together directly or by one or more intermediate parts.

In addition, the terms such as "first" and "second" are used only to discriminate one component (or one part of the component) from another component (or another part of the component).

The existing local dimming technology is generally implemented by performing local adjustment directly on a backlight source. Due to the limitations of the manufacturing process of the display panel, the backlight partitioning algorithm, and the response speed of the driving circuit etc., there are defects such as poor accuracy of backlight control, and halos or artifacts appearing on the display panel, so as to affect the image quality for the display panel.

FIG. 1 shows a schematic diagram of a general structure of the dual-screen display panel. As shown in FIG. 1, the dual-screen display panel may comprise a backlight source 101, a dimming screen 102, and a display screen 103. Furthermore, the dimming screen 102 may comprise a plurality of dimming areas 104, and the display screen 103 may comprise a plurality of display areas 105.

As shown in FIG. 1, the dimming screen 102 may be disposed between the backlight source 101 and the display screen 103. The dimming screen 102 and the display screen 103 may both be color liquid crystal display screens or black and white liquid crystal display screens, or one may be a color liquid crystal display screen and the other may be a black and white liquid crystal display screen. For facilitating the description, in the embodiment of the present disclosure, the dimming screen 102 is a black and white liquid crystal display screen, and the display screen 103 is a color liquid crystal display screen, for example. In some embodiments of the present disclosure, one dimming area 104 may correspond to at least one display area 105. In the example of FIG. 1, one dimming area 104 corresponds to nine display areas 105.

Figure 2:
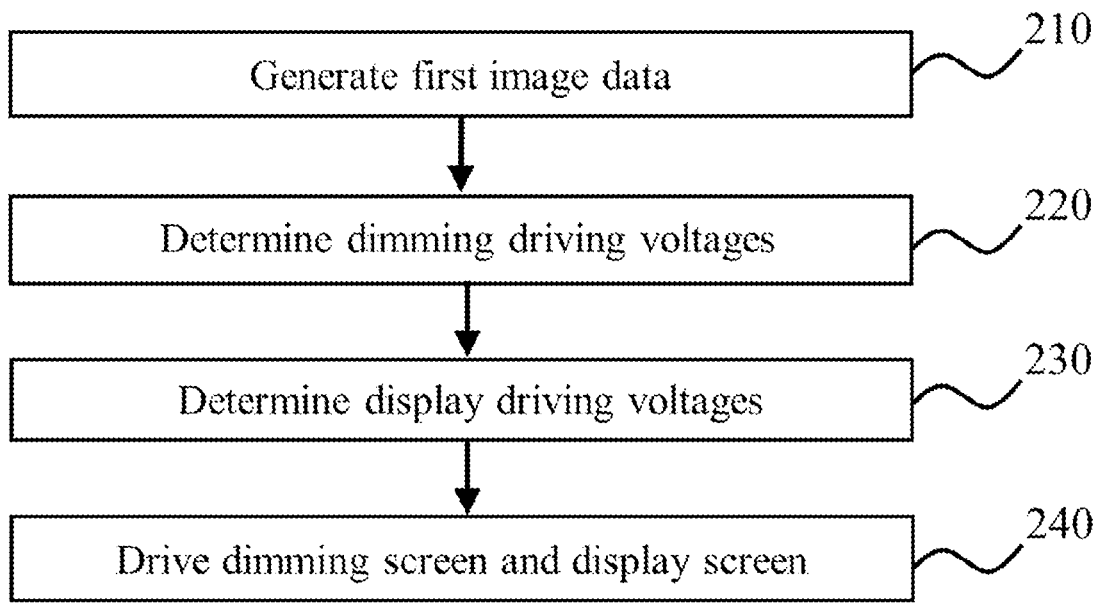
FIG. 2 shows a schematic flowchart of a method for displaying an image on the dual-screen display panel according to an embodiment of the present disclosure.

FIG. 2 is a schematic flowchart of a method for displaying an image on the dual-screen display panel according to an embodiment of the present disclosure. The method according to the embodiments of the present disclosure may be applied to the dual-screen display panel as shown in FIG. 1. The method according to the embodiments will be described in detail below in conjunction with the drawings.

As shown in FIG. 2, at step 210, first image data for the dimming screen may be generated based on image data of the image to be displayed. In the embodiment of the present disclosure, the image data may be in RGB color space and include a respective grayscale of primary colors (e.g. red (R), green (G), and blue (B)) and position information. In the embodiments of the present disclosure, the grayscales may range from 0 to 255 in a 8-graylevel or range from 0 to 65536 in a 16-graylevel, etc.

In the embodiments of the present disclosure, the image data for each display area may be determined based on the image data (e.g., RGB data) of the image. The display area 105 may include one or more pixels. In the case where the display area includes one pixel, the image data of the display area is the RGB data of the single pixel. In the case where the display area includes a plurality of pixels, the image data of the display area may be RGB data formed by an average value or a weighted average value of the R grayscales, an average value or a weighted average value of the G grayscales, and an average value or a weighted average value of the B grayscales of the corresponding plurality of pixels. Then, based on the image data of the display area, a maximum grayscale of the grayscales of the respective primary colors of the display area is determined as a characterizing grayscale of the display area. Then, the grayscale of the corresponding dimming area may be determined based on the characterizing grayscale of the display area. In some embodiments of the present disclosure, one dimming area may correspond to one display area. In this case, the grayscale of the dimming area may be represented by the characterizing grayscale of the display area. In some other embodiments of the present disclosure, one dimming area may correspond to multiple display areas. In this case, the maximum characterizing grayscale of the characterizing grayscales of the multiple display areas may be determined as the grayscale of the dimming area. Those skilled in the art will appreciate that the grayscale of the dimming area may also be determined as a weighted average value or another function of the characterizing grayscales of the corresponding multiple display areas. Through the above operations, the grayscales of the plurality of dimming areas may form the first image data of the dimming screen.

Additionally, in some embodiments of the present disclosure, after the first image data of the dimming screen is generated, the first image data may be blurred to blur edges of the dimming image, thereby reducing the limitation to a dual-screen alignment accuracy. In an embodiment of the present disclosure, the blurring may be performed with a filter template. If the dimming screen is left deviated from the display screen, the dimming image needs to be moved towards right. In this case, a weight for the left in the filter template is set greater than the weight for the right in the filter template, so that the image data in the middle of the image gets closer to the left in the image. The blurring as mentioned above is known to those skilled in the art, and detailed description thereof is omitted here.

At step 220, dimming driving voltages for the plurality of dimming areas may be determined based on the first image data according to a grayscale-dimming driving voltage relationship for the dimming screen. In the embodiments of the present disclosure, the grayscale-dimming driving voltage relationship may be established in advance and represented by a first lookup table. The establishment of the grayscale-dimming driving voltage relationship will be described in detail below in conjunction with FIG. 4. Therefore, in the embodiments of the present disclosure, after the grayscale of each dimming area is obtained, the dimming driving voltage corresponding to the grayscale of the dimming area may be determined by looking up the first lookup table representing the grayscale-dimming driving voltage relationship.

At step 230, display driving voltages for a plurality of display areas may be determined based on the image data according to a grayscale-display driving voltage relationship for the display screen. In the embodiments of the present disclosure, the grayscale-display driving voltage relationship may be established in advance and represented by a second lookup table. In the embodiments of the present disclosure, after the RGB data of each display area is obtained, based on the grayscales of the three primary colors of R, G, and B of the display area, the display driving voltages corresponding to the grayscales of the three primary colors respectively may be determined by looking up the second look-up table representing the grayscale-display driving voltage relationship, thereby obtaining the display driving voltage for the display area.

In the embodiments of the present disclosure, the grayscale-display driving voltage relationship may be determined by the following process. For each grayscale, a second desired transmittance corresponding to the grayscale may be obtained according to a given first grayscale-transmittance diagram for the display screen. Then, according to a predetermined transmittance-driving voltage diagram for the display screen, liquid crystal driving voltages (hereafter referred to "display driving voltages") corresponding to the grayscale may be obtained. Each grayscale is stored in association with its corresponding display driving voltage, and thus the grayscale-display driving voltage relationship can be obtained. In the embodiments of the present disclosure, the first grayscale-transmittance diagram may be a grayscale-transmittance diagram with a gamma (GAMMA) value of 2.2. However, those skilled in the art will appreciate that the first grayscale-transmittance diagram may also be determined according to specific requirements.

At step 240, the dimming screen and the display screen are driven with the dimming driving voltages determined at step 220 and the display driving voltages determined at step 230, respectively, so as to display the image.

It can be seen from the above description that, with the method of the embodiments of the present disclosure, the luminance of the displayed image can be adjusted to meet the desired luminance by adjusting the luminance of the dimming screen, so as to improve the image display quality.

Figure 3:
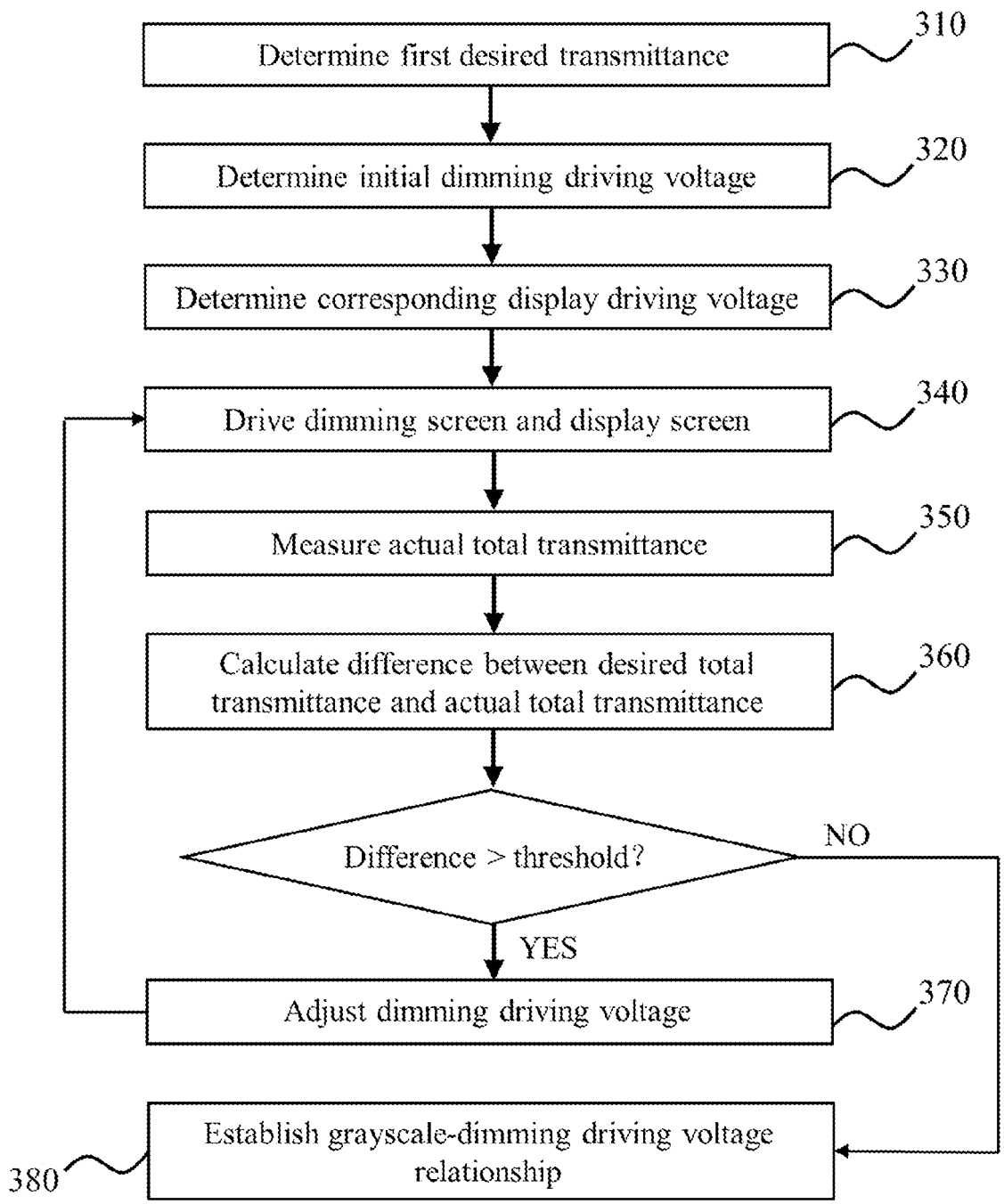
FIG. 3 shows a schematic flowchart of a process for determining a grayscale-dimming driving voltage relationship according to an embodiment of the present disclosure.

FIG. 3 is a schematic flowchart of a process for determining the grayscale-dimming driving voltage relationship according to an embodiment of the present disclosure. The method according to the embodiments is described in detail below in conjunction with the drawings.

As shown in FIG. 3, at step 310, for each of a plurality of grayscales, a first desired transmittance of the dimming screen corresponding to the grayscale may be determined based on the first grayscale-transmittance diagram for the display screen and a second grayscale-transmittance diagram for the dual-screen display panel. Generally, the transmittance of the dual-screen display panel may be calculated by multiplying the transmittance of the dimming screen with the transmittance of the display screen. Therefore, in the embodiments of the present disclosure, a desired total transmittance corresponding to each grayscale may be obtained according to the second grayscale-transmittance diagram. Then, according to the first grayscale-transmittance diagram, the second desired transmittance of the display screen corresponding to each grayscale may be obtained. In the embodiments of the present disclosure, the first grayscale-transmittance diagram may be a grayscale-transmittance diagram with a gamma (GAMMA) value of 2.2, and the second grayscale-transmittance diagram may be a grayscale-transmittance diagram with a gamma value greater than 2.2. Then, a ratio of the desired total transmittance to the second desired transmittance for each grayscale may be calculated as the first desired transmittance of the dimming screen corresponding to the grayscale.

At step 320, an initial dimming driving voltage corresponding to the grayscale may be determined based on the first desired transmittance and the transmittance-driving voltage diagram for the dimming screen.

At step 330, the display driving voltage corresponding to the grayscale is determined based on the first grayscale-transmittance diagram and the transmittance-driving voltage diagram of the display screen. In the embodiments of the present disclosure, for each grayscale, the corresponding second desired transmittance may be obtained based on the first grayscale-transmittance diagram. Then, the corresponding display driving voltage may be obtained based on the second transmittance and the predetermined transmittance-driving voltage diagram for the display screen.

At step 340, for each grayscale, the dimming screen and the display screen may be driven with the corresponding initial dimming driving voltage and the display driving voltage, respectively. In the embodiments of the present disclosure, for a certain grayscale, the grayscales of the respective primary colors may be the same. Therefore, the display driving voltage of each primary color may use the display driving voltage determined at step 330.

At step 350, an actual total transmittance of the dual-screen display panel may be measured. In the embodiments of the present disclosure, for each grayscale, the actual total luminance of the dual-screen display panel may be detected by means of a luminance detection device, and a ratio of the actual total luminance to the maximum luminance of the dual-screen display panel under the same external conditions may be calculated, as the actual total transmittance of the dual-screen display panel.

At step 360, a difference between the desired total transmittance and the actual total transmittance of the dual-screen display panel may be calculated. Then, it is determined whether the difference is greater than a transmittance threshold. If the difference is greater than the transmittance threshold, then at step 370, the dimming driving voltages may be adjusted. In the embodiments of the present disclosure, the dimming driving voltage may be increased by an adjustment step of, for example, 0.01V. Then, back to step 340, the dimming screen and the display screen may be re-driven with the adjusted dimming driving voltages and the display driving voltages, respectively.

If the difference is less than or equal to the transmittance threshold, at step 380, the plurality of grayscales may be stored in association with the corresponding dimming driving voltages to establish the grayscale-dimming driving voltage relationship.

Figure 4:
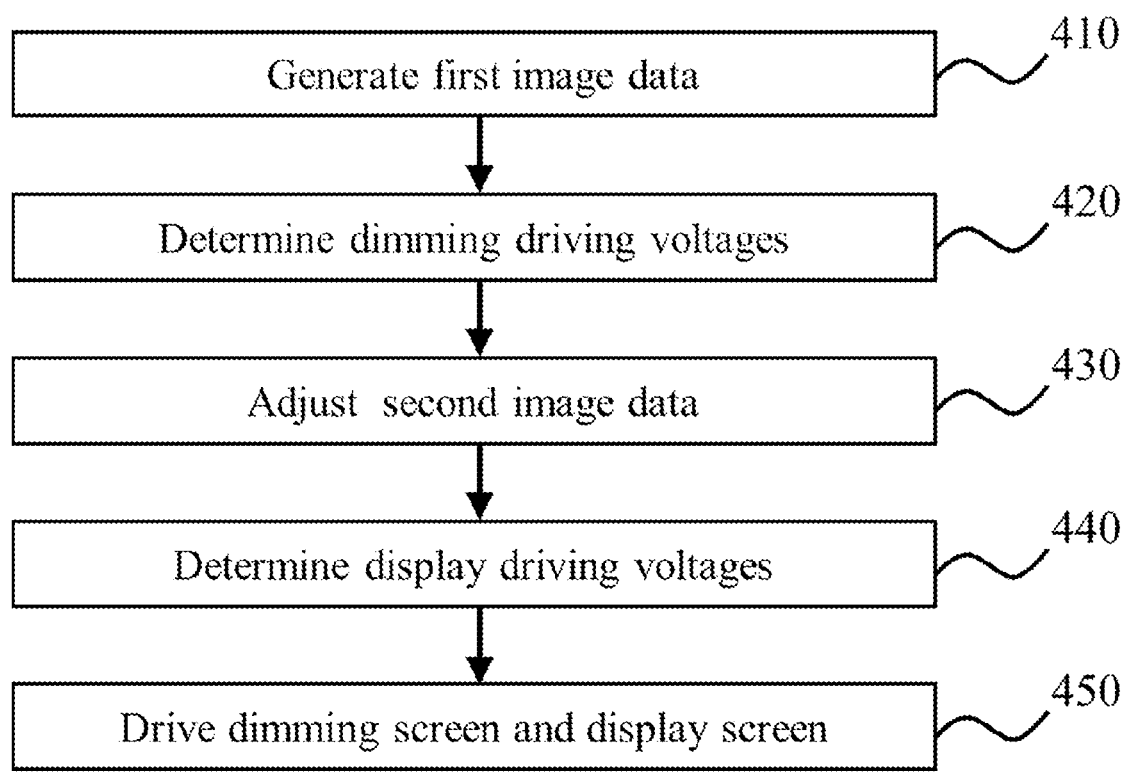
FIG. 4 illustrates a schematic flowchart of a method for displaying an image on the dual-screen display panel according to an embodiment of the present disclosure.

FIG. 4 is a schematic flowchart of a method for displaying an image on the dual-screen display panel according to an embodiment of the present disclosure. In the embodiments of the present disclosure, step 430 of adjusting the image data for the display screen is added to the method as shown in FIG. 2.

As shown in FIG. 4, after or in parallel with generating the first image data for the dimming screen (step 410) and determining the dimming driving voltages (step 420), at step 430, the image data may be adjusted according to a grayscale adjustment relationship for the display screen to generate the second image data for the display screen. In the embodiments of the present disclosure, the grayscale adjustment relationship may be established in advance. The establishment of the grayscale adjustment relationship will be described in detail below. Then, at step 440, the display driving voltages for a plurality of display areas may be determined based on the generated second image data.

In the embodiments of the present disclosure, the grayscale adjustment relationship may include a respective primary color grayscale adjustment table for the primary colors. In this case, at step 430, for the grayscale data of each primary colors in the image data, the adjusted grayscale data of the primary color is obtained using the primary color grayscale adjustment table for the primary color, so as to generate the second image data.

Figure 5:
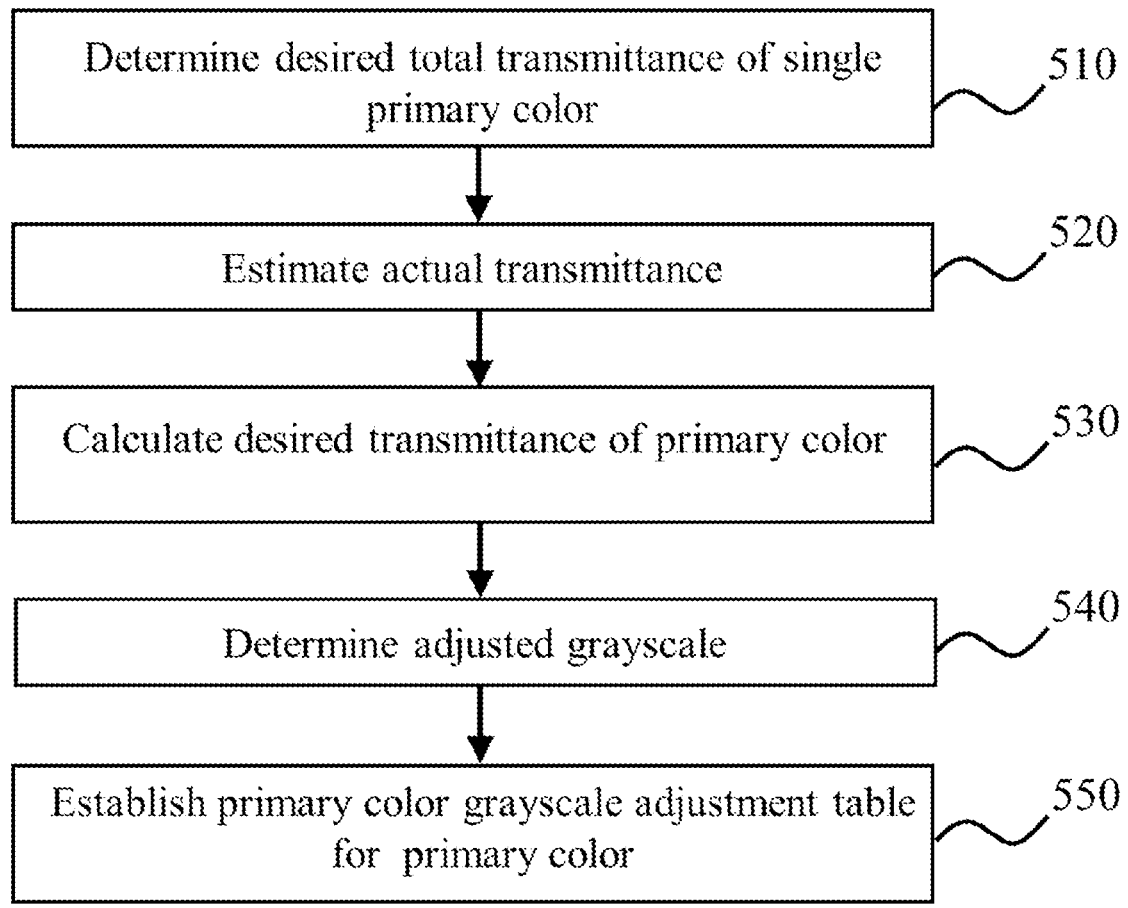
FIG. 5 shows a schematic flowchart of a process for establishing a primary color grayscale adjustment table of a primary color according to an embodiment of the present disclosure.

FIG. 5 schematically shows a process for determining the primary color grayscale adjustment table for a single primary color according to an embodiment of the present disclosure. As shown in FIG. 5, at step 510, for each of a plurality of grayscales, the desired total transmittance of the single primary color for the dual-screen display panel may be determined based on a desired grayscale-transmittance diagram of the primary color. In the embodiments of the present disclosure, the total luminance of backlight emitted by the backlight source of the dual-screen display panel and the luminance of the primary color in the backlight may be measured by a luminance measurement device. Then, a ratio of the luminance of the primary color to the total luminance may be calculated. Then, the desired grayscale-transmittance diagram of the primary color may be determined according to the calculated ratio and the desired grayscale-transmittance diagram (i.e., the second grayscale-transmittance diagram) of the dual-screen display panel. In this embodiment, the desired grayscale-transmittance diagram of the primary color may be expressed as:

$$Tr\_sub = k * Tr\_sum, \quad \text{(Formula 1)}$$

where Tr_sub represents the desired grayscale-transmittance diagram of the primary color, Tr_sum represents the second grayscale-transmittance diagram, and k represents the ratio of the luminance of the primary color to the total luminance of the backlight. Then, for each grayscale, the desired total transmittance of the primary color may be obtained based on the desired grayscale-transmittance diagram of the primary color.

At step 520, the actual transmittance of the dimming screen corresponding to the grayscale may be estimated according to the grayscale-dimming driving voltage relationship and the transmittance-driving voltage diagram of the dimming screen. In the embodiments of the present disclosure, the dimming driving voltage corresponding to each grayscale may be determined according to the grayscale-dimming driving voltage relationship established by the process as shown in FIG. 3 described above. Then, based on the transmittance-driving voltage diagram of the dimming screen, the actual transmittance of the dimming screen corresponding to the dimming voltage of each grayscale may be estimated.

At step 530, a ratio of the desired total transmittance of the primary color to the estimated actual transmittance of the dimming screen may be calculated as the desired transmittance of the primary color of the display screen. In the embodiments of the present disclosure, for each grayscale, the ratio of the desired total transmittance of the primary color to the estimated actual transmittance of the dimming screen may be calculated as the desired transmittance of the primary color of the display screen.

At step 540, for each grayscale, the adjusted grayscale may be determined based on the desired transmittance of the primary color and the first grayscale-transmittance diagram of the display screen. Then, at step 550, the plurality of grayscales may be stored in association with the corresponding adjusted grayscales to establish the primary color grayscale adjustment table for the primary color.

Therefore, for each primary color, the corresponding primary color grayscale adjustment table may be established according to the process as shown in FIG. 5.

In the embodiments of the present disclosure, the grayscale adjustment relationship may be a dimming formula. In this case, at step 430, the adjusted grayscales of multiple display areas may be calculated using the dimming formula based on the grayscales of the multiple display areas. In the embodiments of the present disclosure, the dimming formula may be expressed as follows:

$$Y = y + a*y*(b*y\_feature - y)/y\_feature, \quad \text{(Formula 2)}$$

where Y represents the adjusted grayscale, y represents an initial image grayscale, y_feature represents a feature grayscale, and a and b represents adjustment coefficients. In this embodiment, for each of the multiple display areas, the image data of the display area may be transformed from the RGB color space to the YCbCr color space by:

$$Y=0.299R+0.587G+0.114B$$

$$Cr=(0.500R-0.4187G-0.0813B)+128$$

$$Cb=(-0.1687R-0.3313G+0.500B)+12, \quad \text{(Formula 3)}$$

where Y represents the grayscale, Cr represents a red chrominance component, and Cb represents a blue chrominance component. Then, the grayscale Y of the display area may be adjusted using the above dimming formula (2) to obtain the adjusted grayscale. Then, the adjusted RGB data of the display area may be obtained based on the adjusted grayscale, the red chrominance component Cr, and the blue chrominance component Cb.

Figure 6:
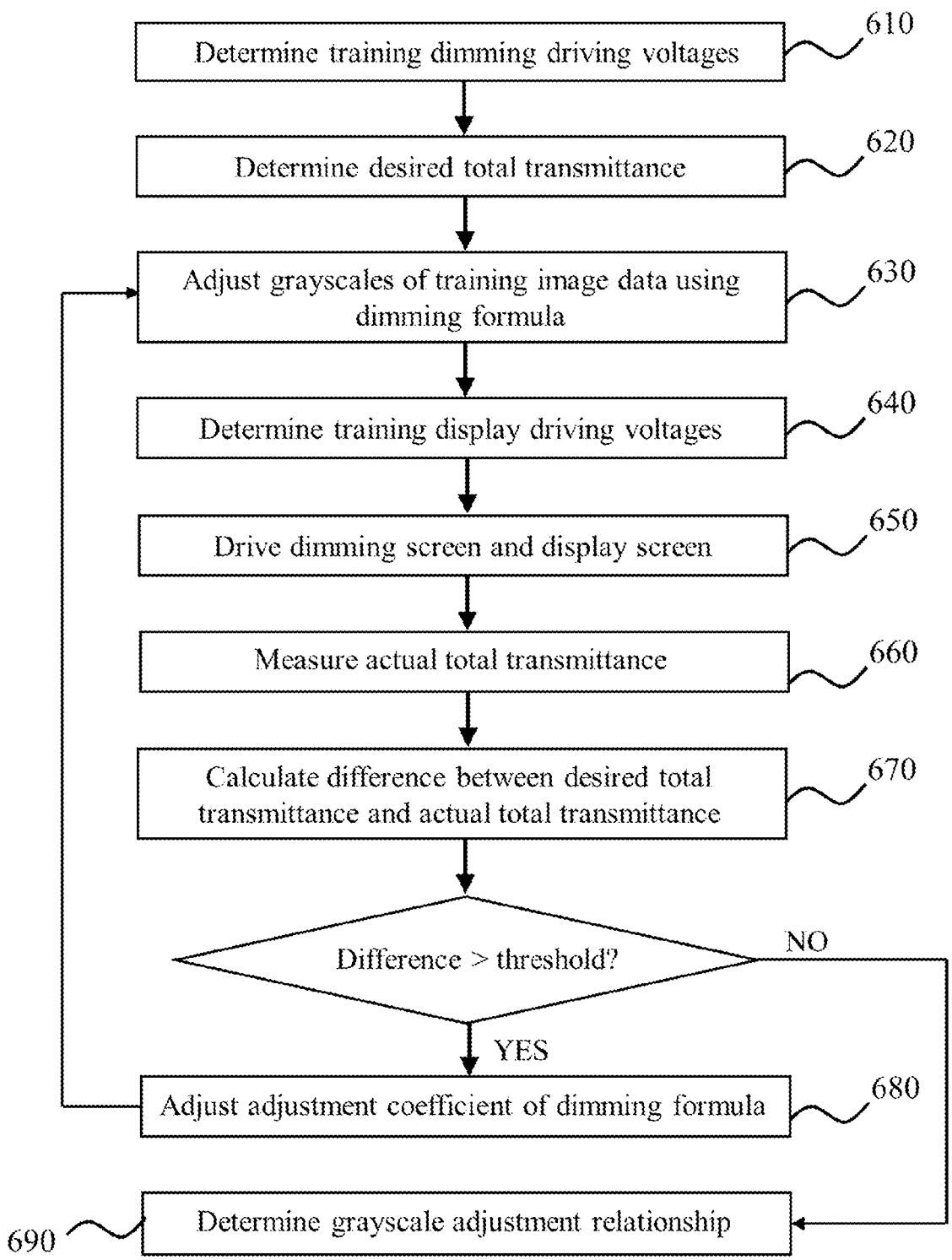
FIG. 6 shows a schematic flowchart of a process for determining a dimming formula as a grayscale adjustment relationship according to an embodiment of the present disclosure.

FIG. 6 shows a schematic flowchart of a process for determining the dimming formula. As shown in FIG. 6, at step 610, training dimming driving voltages for each dimming area may be determined according to training image data and the grayscale-dimming driving voltage relationship. In the embodiments of the present disclosure, according to the training image data, the maximum grayscale of the grayscales of the respective primary colors in each display area may be determined as the characterizing grayscale of the display area. Then, the grayscale of the corresponding dimming area may be determined based on the characterizing grayscale of the display area. In some embodiments of the present disclosure, one dimming area may correspond to one display area. In this case, the grayscale of the dimming area may be determined as the characterizing grayscale of the display area. In some embodiments of the present disclosure, one dimming area may correspond to multiple display areas. In this case, the maximum characterizing grayscale of the characterizing grayscales of the multiple display areas corresponding to the dimming area may be determined as the grayscale of the dimming area. Those skilled in the art will appreciate that the grayscale of the dimming area may also be determined as a weighted average value or any other functions of the characterizing grayscales of the corresponding multiple display areas. Then, the training dimming driving voltages of the dimming area may be determined according to the grayscale-dimming driving voltage established through the process as shown in FIG. 3.

At step 620, the desired total transmittance of each display area of the dual-screen display panel may be determined based on the training image data and the second grayscale-transmittance diagram for the dual-screen display panel. In the embodiments of the present disclosure, the desired grayscale-transmittance diagram of each primary color may be obtained using the second grayscale-transmittance diagram, as described above. Then, based on the RGB data of each display area in the training image data (e.g. the RGB data), the desired total transmittance of each primary color of R, G, and B in the display area may be determined based on the desired grayscale-transmittance diagrams for the respective primary colors. Then, an average value of the desired total transmittances of the respective primary colors in the display areas may be calculated as the desired total transmittance of the display area. Obviously, those skilled in the art will appreciate that any other functions of the desired total transmittances of the respective primary colors may also be used to calculate the desired total transmittance of the display area.

At step 630, the grayscales of the training image data may be adjusted using the dimming formula. In the embodiments of the present disclosure, the dimming formula may be the above Formula (2). Using Formula (2), the adjusted grayscales of the respective primary colors of the training image data may be obtained. In the embodiments of the present disclosure, the training image data may be transformed into the image data in the YCbCr color space according to Formula (3). Then, the grayscale Y may be adjusted using Formula (2).

At this time, the adjustment coefficients a and b in Formula (2) may both be set to 1. In this embodiment, for the training image data, the ratio of the number of the grayscales to the number of the display areas of the display screen may be accumulated in an decreasing order of the grayscales. When the accumulated ratio is equal to or greater than a preset value, the minimum grayscale of the grayscales used for the accumulation may be determined as the characterizing grayscale. Therefore, the characterizing grayscale can be obtained based on the image data. Those skilled in the art will appreciate that the preset value for determining the characterizing grayscale may be set as required.

At step 640, the training display driving voltages for each display area may be determined according to the adjusted grayscales and grayscale-display driving voltage relationship. In the embodiments of the present disclosure, the adjusted RGB image data of each display area may be obtained based on the adjusted grayscale, the red chrominance component Cr, and the blue chrominance component Cb of the display area. Then, according to the grayscale-display driving voltage relationship established through the process as shown in FIG. 2, the training display driving voltages corresponding to the adjusted image data may be obtained.

At step 650, the dimming screen and the display screen may be driven with the training dimming driving voltages and the training display driving voltages, respectively. Then, at step 660, the actual total transmittance of each display area of the dual-screen display panel may be measured. In the embodiments of the present disclosure, the actual luminance of each display area and the maximum luminance of each display area under the same external conditions for the dual-screen display panel may be measured by a luminance detection device. Then, the ratio of the actual luminance of each display area to the corresponding maximum luminance may be determined as the actual total transmittance of the display area of the dual-screen display panel.

At step 670, the difference between the desired total transmittance and the actual total transmittance of each display area of the dual-screen display panel may be calculated. Then, it may be determined whether the difference is greater than the transmittance threshold. If the difference is greater than the transmittance threshold, then at step 680, the adjustment coefficient of the dimming formula may be adjusted. In the embodiments of the present disclosure, if the difference of any display area is greater than the transmittance threshold, the adjustment coefficients a and/or b will be adjusted. Then, back to step 630, the grayscales of the training image data may be readjusted using the adjusted dimming formula.

If the difference is less than or equal to the transmittance threshold, at step 690, the current dimming formula may be determined as the grayscale adjustment relationship. In the embodiments of the present disclosure, if the difference of each display area is less than or equal to the transmittance threshold, the current dimming formula may be determined as the grayscale adjustment relationship of the display screen.

It can be seen from the above description that the method according to the embodiments of the present disclosure may further adjust the grayscale of each primary color of the image data, so as to further improve the quality of image display.

Figure 7:
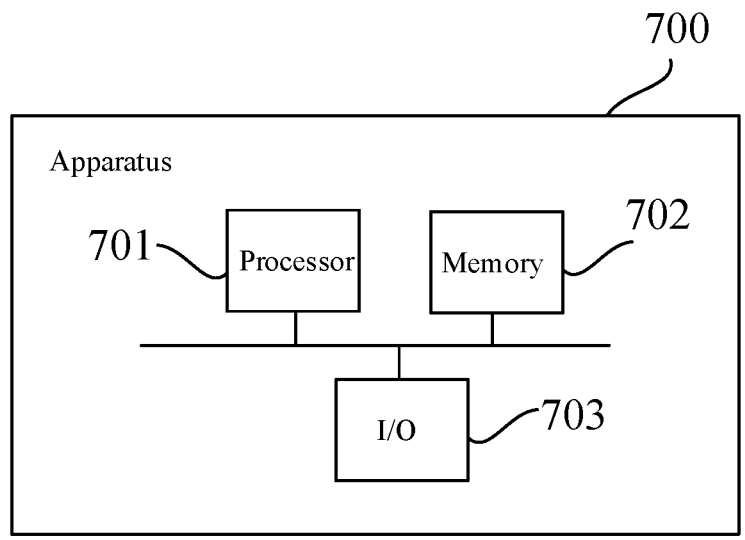
FIG. 7 shows a schematic diagram of an apparatus for displaying an image on the dual-screen display panel according to an embodiment of the present disclosure.

FIG. 7 is a schematic diagram of an apparatus 700 for displaying an image on the dual-screen display panel according to an embodiment of the present disclosure. As shown in FIG. 7, the apparatus may comprise one or more processors 701 and a memory 702 coupled to the one or more processors 701. The apparatus 700 may further comprise an I/O device 703 coupled to the one or more processors 701 and the memory 702. Computer program instructions may be stored in the memory 702. The computer program instructions, when executed by the one or more processors 701, may cause the apparatus 700 to execute the method described with reference to FIGS. 2 to 6.

Figure 8:
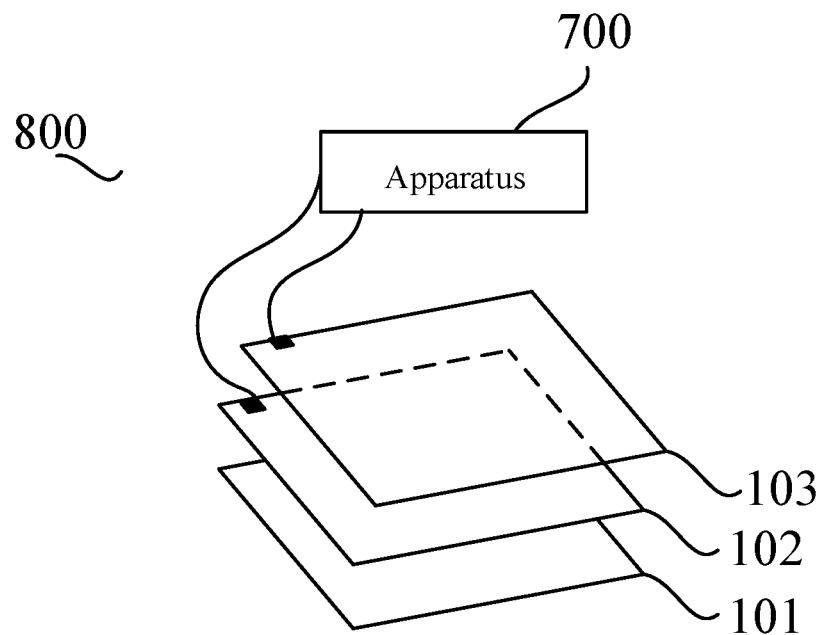
FIG. 8 shows a schematic diagram of the dual-screen display panel according to an embodiment of the present disclosure.

FIG. 8 is a schematic diagram of the dual-screen display panel 800 according to an embodiment of the present disclosure. As shown in FIG. 8, the dual-screen display panel 800 may comprise the backlight source 101, the dimming screen 102, the display screen 103, and the apparatus 700 for displaying an image on the dual-screen display panel. In the embodiments of the present disclosure, the dimming screen 102 may be disposed between the backlight source 101 and the display screen 103. The dimming screen 102 may be a black and white liquid crystal display screen, and the display screen 103 may be a color liquid crystal display screen.

Several embodiments of the present disclosure have been described specifically above, but the protection scope of the present disclosure is not limited thereto. In fact, the novel embodiments described herein can be implemented in various other forms. in addition, various omissions, substitutions and modifications in the form of the embodiments described herein may be made without departing from the spirit of the present disclosure. The appended claims and their equivalents are intended to cover such forms or modifications that fall within the scope and spirit of the present disclosure.

What is claimed is:

1. A method for displaying an image on a dual-screen display panel, wherein the dual-screen display panel comprises a dimming screen and a display screen, the display screen comprises a plurality of display areas, and the dimming screen comprises a plurality of dimming areas, the method comprising:
generating first image data for the dimming screen according to image data of the image;
determining dimming driving voltages for the plurality of dimming areas based on the first image data according to a grayscale-dimming driving voltage relationship for the dimming screen;
adjusting the image data to generate second image data for the display screen according to a grayscale adjustment relationship for the display screen;
determining display driving voltages for the plurality of display areas based on the second image data according to a grayscale-display driving voltage relationship for the display screen; and
driving the dimming screen and the display screen with the dimming driving voltages and the display driving voltages, respectively, to display the image.

2. The method according to claim 1, wherein generating the first image data for the dimming screen comprises:
determining a characterizing grayscale of each of the plurality of display areas based on the image data; and
determining a grayscale of each of the plurality of dimming areas based on the characterizing grayscale of each display area to form the first image data.

3. The method according to claim 2, wherein determining the characterizing grayscale of each of the plurality of display areas comprises:
determining a grayscale of each primary color for each display area based on the image data; and
determining, for each display area, a maximum grayscale of the grayscales of the primary colors as the characterizing grayscale of the display area.

4. The method according to claim 2, wherein one dimming area corresponds to one display area, and wherein the grayscale of each of the plurality of dimming areas is determined as the characterizing grayscale of the corresponding display area.

5. The method according to claim 2, wherein one dimming area corresponds to multiple display areas, and wherein determining the grayscale of each of the plurality of dimming areas based on the characterizing grayscale of each display area comprises:
determining, for each dimming area, the maximum characterizing grayscale of the characterizing grayscales of the corresponding multiple display areas as the grayscale of the dimming area.

6. The method according to claim 1, wherein the grayscale adjustment relationship comprises a respective primary color grayscale adjustment table for each primary color; and
wherein adjusting the image data to generate the second image data for the display screen according to the grayscale adjustment relationship for the display screen comprises:
obtaining, for grayscale data of the respective primary colors in the image data, adjusted grayscale data by means of the respective primary color grayscale adjustment table.

7. The method according to claim 1, wherein the grayscale adjustment relationship comprises a dimming formula,
wherein adjusting the image data to generate second image data for the display screen according to the grayscale adjustment relationship for the display screen comprises:
obtaining grayscales of the plurality of display areas according to the image data;
calculating adjusted grayscales of the plurality of display areas using the dimming formula based on the grayscales of the plurality of display areas; and
obtaining adjusted image data as the second image data according to the adjusted grayscales.

8. The method according to claim 1, wherein the grayscale-dimming driving voltage relationship is established by:
determining, for each of a plurality of grayscales, a first desired transmittance of the dimming screen corresponding to the grayscale based on a first grayscale-transmittance diagram for the display screen and a second grayscale-transmittance diagram for the dual-screen display panel;
determining an initial dimming driving voltage corresponding to the grayscale based on the first desired transmittance and a transmittance-driving voltage diagram for the dimming screen;

determining a display driving voltage corresponding to the grayscale based on the first grayscale-transmittance diagram and the transmittance-driving voltage diagram for the display screen;

driving the dimming screen and the display screen with the initial dimming driving voltages and the display driving voltages, respectively;

measuring an actual total transmittance of the dual-screen display panel;

adjusting, in response to a difference between a desired total transmittance and the actual total transmittance of the dual-screen display panel being greater than a transmittance threshold, the dimming driving voltage until the difference is less than or equal to the transmittance threshold; and storing the plurality of grayscales in association with the corresponding dimming driving voltages to establish the grayscale-dimming driving voltage relationship.

9. The method according to claim 8, wherein determining the first desired transmittance of the dimming screen corresponding to the grayscale comprises:

determining a second desired transmittance of the display screen corresponding to the grayscale based on the first grayscale-transmittance diagram;

determining the desired total transmittance of the dual-screen display panel corresponding to the grayscale based on the second grayscale-transmittance diagram; and calculating a ratio of the desired total transmittance to the second desired transmittance as the first desired transmittance.

10. The method according to claim 1, wherein the grayscale adjustment relationship comprises a respective primary color grayscale adjustment table for each primary color; and wherein the primary color grayscale adjustment table for a primary color is established by:

determining, for each of a plurality of grayscales, a desired total transmittance of the primary color of the dual-screen display panel based on a desired grayscale-transmittance diagram of the primary color;

estimating an actual transmittance of the dimming screen corresponding to the grayscale according to the grayscale-dimming driving voltage relationship and a transmittance-driving voltage diagram for the dimming screen;

calculating a ratio of the desired total transmittance of the primary color to the estimated actual transmittance of the dimming screen as a desired transmittance of the primary color of the display screen;

determining an adjusted grayscale based on the desired transmittance of the primary color and a first grayscale-transmittance diagram of the display screen; and storing the plurality of grayscales in association with the corresponding adjusted grayscales to establish the primary color grayscale adjustment table for the primary color.

11. The method according to claim 10, wherein the desired grayscale-transmittance diagram of the primary color is determined by:

measuring a total luminance of backlight emitted by a backlight source and a luminance of the primary color in the backlight;

calculating a ratio of the luminance of the primary color to the total luminance; and obtaining the desired grayscale-transmittance diagram of the primary color according to the ratio and a second grayscale-transmittance diagram for the dual-screen display panel.

12. The method according to claim 1, wherein the grayscale adjustment relationship is established by:

determining training dimming driving voltages for each of the plurality of dimming areas according to training image data and the grayscale-dimming driving voltage relationship;

determining a desired total transmittance of the dual-screen display panel according to the training image data and a second grayscale-transmittance diagram for the dual-screen display panel;

adjusting grayscales of the training image data using a dimming formula;

determining training display driving voltages for each of the plurality of display areas according to the adjusted grayscales and the grayscale-display driving voltage relationship;

driving the dimming screen and the display screen with the training dimming driving voltages and the training display driving voltages, respectively;

measuring an actual total transmittance of the dual-screen display panel;

adjusting, in response to a difference between the desired total transmittance and the actual total transmittance of the dual-screen display panel being greater than a transmittance threshold, an adjustment coefficient of the dimming formula until the difference is less than or equal to the transmittance threshold; and determining, in response to the difference being less than or equal to the transmittance threshold, the current dimming formula as the grayscale adjustment relationship.

13. The method according to claim 12, wherein the dimming formula is as follows:

$$Y = y + a^* y^* (b^* y\_\text{feature} - y)/y\_\text{feature},$$

where Y represents an adjusted grayscale, y represents an initial grayscale, y_feature represents a feature grayscale, and a and b represent adjustment coefficients.

14. The method according to claim 12, wherein determining training dimming driving voltages for each of the plurality of dimming areas according to training image data and the grayscale-dimming driving voltage relationship comprises:

determining a characterizing grayscale of each of the plurality of display areas based on the training image data;

determining grayscale data of each dimming area based on the characterizing grayscale of each display area; and determining the training dimming driving voltages for each dimming area according to the grayscale-dimming driving voltage relationship and the grayscale data of each dimming area.

15. The method according to claim 14, wherein determining the characterizing grayscale of each of the plurality of display areas comprises:

determining grayscale data of each primary color for each of the plurality of display areas according to the training image data; and determining, for each display area, the maximum grayscale data of the grayscale data as the characterizing grayscale of the display area.

16. The method according to claim 14, wherein one dimming area corresponds to one display area; and
wherein the grayscale data of each dimming area is determined as the characterizing grayscale of the corresponding display area.

17. The method according to claim 14, wherein one dimming area corresponds to multiple display areas; and
wherein determining grayscale data of each dimming area based on the characterizing grayscale of each display area comprises:
determining, for each dimming area, the maximum characterizing grayscale of the characterizing grayscales of the corresponding multiple display areas as the grayscale data of the dimming area.

18. An apparatus for displaying an image on a dual-screen display panel, comprising:
one or more processors;
a memory coupled to the one or more processors and having computer program instructions stored therein, wherein the computer program instructions, when executed by the one or more processors, cause the apparatus to perform the method according to claim 1.

19. A dual-screen display panel, comprising: a backlight source, a dimming screen, a display screen, and an apparatus according to claim 18, wherein the dimming screen is disposed between the backlight source and the display screen.

\* \* \* \* \*